US011448534B2

(12) United States Patent
Stevens et al.

(10) Patent No.: US 11,448,534 B2
(45) **Date of Patent: *Sep. 20, 2022**

(54) CATALYST FLOW SENSOR

(71) Applicant: Magnum Venus Products, Knoxville, TN (US)

(72) Inventors: Elijah Stevens, Friendsville, TN (US); Tim Kruse, Maynardville, TN (US); Benjamin Hedger, Knoxville, TN (US)

(73) Assignee: Magnum Venus Products, Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/180,139

(22) Filed: Feb. 19, 2021

(65) Prior Publication Data

US 2021/0172771 A1 Jun. 10, 2021

Related U.S. Application Data

(63) Continuation of application No. 16/163,672, filed on Oct. 18, 2018, now Pat. No. 10,955,272.

(60) Provisional application No. 62/573,850, filed on Oct. 18, 2017.

(51) Int. Cl.

| | |
|---|---|
| ***G01F 1/002*** | (2022.01) |
| ***B01J 37/04*** | (2006.01) |
| ***G01F 1/60*** | (2006.01) |
| ***G01F 1/58*** | (2006.01) |
| ***G01F 1/20*** | (2006.01) |

(52) U.S. Cl.

CPC .............. *G01F 1/005* (2013.01); *B01J 37/04* (2013.01); *G01F 1/20* (2013.01); *G01F 1/582* (2013.01); *G01F 1/60* (2013.01)

(58) Field of Classification Search

CPC ........................................................ B01J 37/04
USPC ........................................................... 73/861
See application file for complete search history.

(56) References Cited

U.S. PATENT DOCUMENTS

| | | | |
|---|---|---|---|
| 4,275,172 | A | 6/1981 | Barth et al. |
| 4,566,337 | A | 1/1986 | Smart |
| 5,019,678 | A | 5/1991 | Templeton et al. |

(Continued)

FOREIGN PATENT DOCUMENTS

| | | |
|---|---|---|
| JP | 3997330 B1 | 10/2007 |

OTHER PUBLICATIONS

International Search Report and Written Opinion for PCT/US2018/056414 dated Apr. 30, 2020 (10 pages).

(Continued)

*Primary Examiner* — Nathaniel T Woodward
(74) *Attorney, Agent, or Firm* — Luedeka Neely Group, PC

(57) ABSTRACT

A catalyst alarm system for resin/catalyst spray applications, the system having a first flow sensor that monitors whether a catalyst from a manifold is flowing for supply to a spay gun or other applicator at a specified minimum rate; a second flow sensor that detects if the catalyst is flowing out of a bypass conduit of the manifold, which indicates the catalyst is not being mixed with the resin; a third flow sensor that detects if the catalyst is flowing out of an over-pressure conduit of the manifold, which indicates that only a partial amount of the required catalyst is being mixed with the resin; and monitoring circuitry for providing alarm and/or control features based on activation combinations of the three flow sensors.

4 Claims, 11 Drawing Sheets

(56) References Cited

U.S. PATENT DOCUMENTS

| | | | | |
|---|---|---|---|---|
| 5,072,728 | A * | 12/1991 | Pasternack | A62B 9/00 128/205.12 |
| 6,179,223 | B1 | 1/2001 | Sherman et al. | |
| 7,942,070 | B2 * | 5/2011 | Ertler | G01F 3/10 73/861.77 |
| 2004/0226388 | A1 * | 11/2004 | Riegel | G01F 1/24 73/861.57 |
| 2007/0199388 | A1 * | 8/2007 | Furkert | G01F 15/006 73/861.57 |
| 2010/0100654 | A1 * | 4/2010 | Ramsay | G06F 13/385 710/100 |
| 2017/0219394 | A1 | 8/2017 | Lukito | |

OTHER PUBLICATIONS

Search report for U.S. Appl. No. 18/868,510 dated Jun. 4, 2021 (9 pages).

* cited by examiner

CATALYST FLOW SENSOR

CROSS-REFERENCE TO RELATED APPLICATION

This application claims priority to U.S. Provisional Application No. 62/573,850 filed Oct. 18, 2017, entitled Catalyst Flow Switch with Flow Alarm, incorporated herein by reference in its entirety.

FIELD

This invention relates to catalyst delivery systems for short-fiber composite manufacturing processes. More particularly, this invention relates to catalyst flow sensors and associated methods and alarm systems that indicate and provide an alarm when catalyst is not flowing in a correct manner.

BACKGROUND

Liquid resins and catalysts used for spray applications associated with short-fiber composite manufacturing processes are typically mixed just before spraying and it is important to maintain the flows in desired amounts. The catalyst is an initiator for a polymerization reaction with the resin and the catalyst is typically highly reactive. Conventional flow sensors are unsuitable for use with highly reactive catalyst fluids and their typical process conditions involving high pressures.

Prior flow sensors have been found to be incompatible for use with catalysts due to the highly reactive nature of catalysts such as methyl ethyl ketone peroxide (MEKP), and high-pressure conditions, such as up to about 1500 psi, typically associated with such spray processes. Accordingly, what is desired is a flow sensing apparatus that is suitable for monitoring the flow of a liquid catalyst and for signaling when the flow is outside of a desired range.

The present disclosure advantageously provides catalyst flow sensors and associated delivery systems configured for use with liquid catalysts to detect when the flow rate of the catalyst is outside of a desired range. The sensors are configured for use with reactive catalysts under high pressure conditions, and the systems advantageously include an alarm or other indicators designed to alert a user when catalyst is not flowing as desired.

SUMMARY

The disclosure relates to liquid flow sensors, methods for monitoring liquid flows, and to flow monitoring systems.

In one aspect, the disclosure relates to a liquid flow sensor that includes an elongate flow tube having an inlet end and an outlet end. Liquid flows into the flow tube at the inlet end and exits from the outlet end. A float is located in the flow tube and configured for the liquid flowing in the flow tube to flow around the float, the float including a magnet. An electrical circuit is proximate the flow tube. The electrical circuit includes a magnetic sensor located proximate the float for sensing a position of the magnet in the flow tube. The position of the magnet in the flow tube is related to the position of the float in the flow tube, which is related to flow characteristics associated with flow of the liquid through the flow tube.

In another aspect, the disclosure provides a method of monitoring flow of a liquid. The method includes the steps of flowing a liquid under pressure through an elongate flow tube having an inlet end and an outlet end, wherein the liquid flows into the flow tube at the inlet end and exits at the outlet end; providing a float including a magnet in the flow tube, the float configured so that the liquid flowing in the flow tube flows around the float; directing the flow of liquid through the elongate flow tube to contact and flow around the float such that the position of the float in the flow tube is dependent upon the flow of liquid through the flow tube; and sensing a position of the magnet in the flow tube. The position of the magnet in the flow tube is related to the position of the float in the flow tube, which is related to flow characteristics associated with flow of the liquid through the flow tube.

In a further aspect, the disclosure relates to a flow monitoring system. The system includes a source of pressurized liquid capable of providing a feed flow of the liquid, or a recirculating flow of a liquid, or an overpressure flow of the liquid, or combinations thereof. The system also includes a first flow sensor for receiving the feed flow of the liquid, a second flow sensor for receiving the recirculating flow of the liquid, and a third flow sensor for receiving the overpressure flow of the liquid. Each of the first, second and third flow sensors include a flow tube having a float located in the flow tube and configured for liquid flowing in the flow tube to flow around the float. Each float includes a magnet.

The system also includes an electronic circuit. The electronic circuit includes (i) a first magnetic sensor located proximate the first flow sensor for sensing a position of the magnet in the float of the first flow sensor, wherein the position of the magnet in the flow tube of the first flow sensor is related to flow characteristics associated with the feed flow of the liquid through the first flow sensor, (ii) a second magnetic sensor located proximate the second flow sensor for sensing a position of the magnet in the float of the second flow sensor, wherein the position of the magnet in the flow tube of the second flow sensor is related to flow characteristics associated with the recirculating flow of the liquid through the second flow sensor, and (iii) a third flow sensor for sensing a position of the magnet in the float of the third flow sensor, wherein the position of the magnet in the flow tube of the third flow sensor is related to flow characteristics associated with the overpressure flow of the liquid through the third flow sensor.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
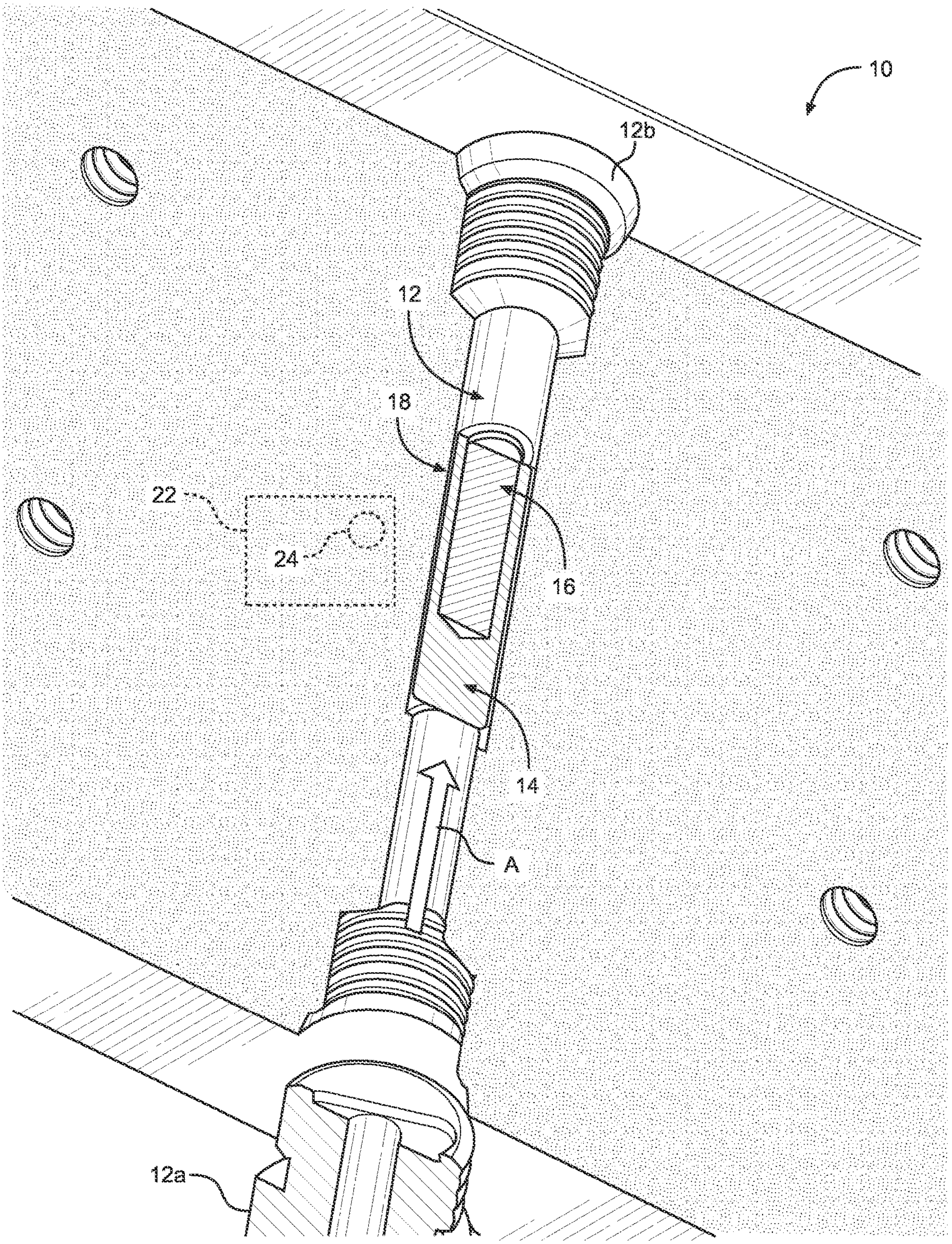
FIG. 1 is a perspective view showing a catalyst flow sensor according to the disclosure.
Figure 2:
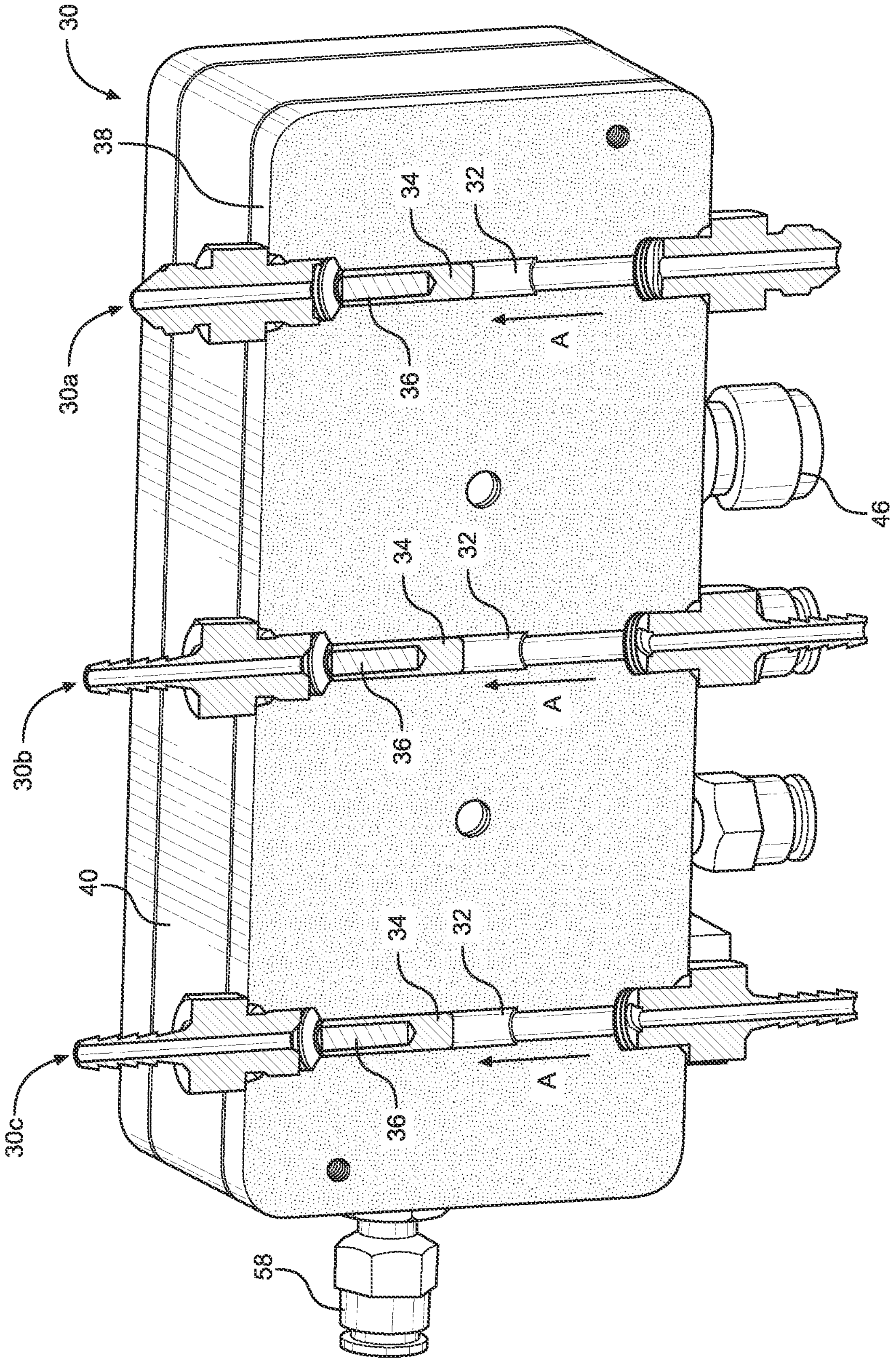
FIG. 2 is a cross-sectional view of a catalyst flow sensor array according to the disclosure.
Figure 3:
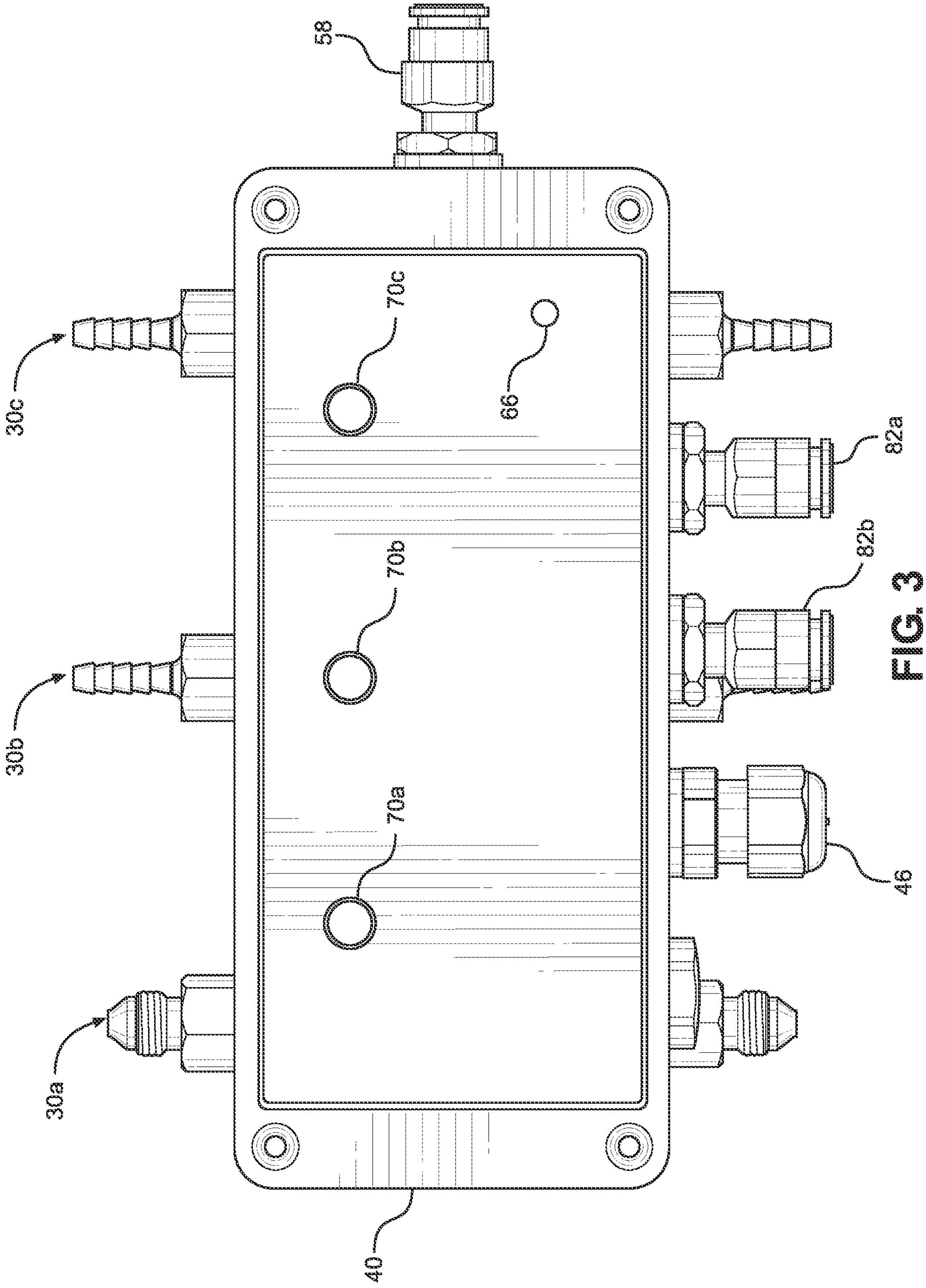
FIG. 3 shows a front panel of the catalyst flow sensor array of FIG. 2.

With initial reference to FIG. 1, there is shown a flow sensor 10 according to the disclosure and configured for use with liquid catalysts and designed to detect when the flow of catalyst is outside of predetermined parameters. An example catalyst is a water-soluble organic peroxide known as methyl ethyl ketone peroxide (MEKP). MEKP has a viscosity at 20 degrees C. of 31 mPas.

The flow sensor 10 and the devices described herein that incorporate such flow sensors are desirable for use on the supply line of a catalyst to be mixed with a resin via a spray applicator for short-fiber composite manufacturing processes. In these processes, the resin and the catalyst are mixed just before application/spraying and it is important to maintain the flows in desired amounts. The present disclosure relates to monitoring of the flow of the catalyst, which is typically supplied at a pressure of about 1,500 psi.

The flow sensor 10 includes a catalyst flow tube 12 formed as by machining the flow tube 12 through a block of metal such as stainless steel. Catalyst flows through the flow tube 12 in the direction of arrow A from a source of catalyst toward a spray gun, nozzle or other applicator device. For example, a catalyst pump provides a pressurized flow of catalyst via tubing into an entrance end 12*a* of the flow tube 12 for exit via tubing connected to an exit end 12*b* of the flow tube to a spray nozzle or applicator device. Typically, mixing of resin and catalyst occurs within the spray nozzle or applicator device.

A float 14 having a magnet 16 embedded therein is located within the catalyst flow tube 12. The float 14 is desirably cylindrical and sized smaller than the catalyst flow tube 12 to provide a fluid gap 18 between the float 14 and the interior sidewall of the catalyst flow tube 12.

The flow sensor 10 includes an enclosure (not shown), desirably of metal and attached to the block of metal through which the flow tube 12 is machined, for housing an electrical control circuit such as a circuit having a microcontroller 22 and a giant magnetoresistance (GMR) sensor 24 located in proximity to the magnet 16 so as to be able to detect the location of the magnet 16 in the float 14 in the catalyst flow tube 12. The enclosure serves to protect the internal circuitry from the potentially reactive environment associated with resin/catalyst spray operations.

The GMR sensor 24 is a multilayer sensor having alternating ferromagnetic and non-magnetic conductive layers. In broad overview, the sensor 24 detects the magnetic field of the magnet 16, and detects changes in the magnetic field corresponding to changes in position of the magnet 16.

When the flow sensor 10 is in use to detect the flow of catalyst, the float 14 will rise if the minimum flow rate of the catalyst is such that the forces generated in the fluid gap caused by the shearing of the fluid between the float 14 and the flow tube 12 are sufficient to overcome the combined weight of the float 14 and the magnet 16 embedded in the float 14. Thus, the position of the float 14 will vary based on the flow rate of the catalyst. The sensor 24 detects the position of the float 14 in the flow tube 12 and generates output signals corresponding to the detected position of the float 14.

The float 14 will be located in a desired range of positions if the flow rate of the catalyst is within a desired range. In the event the position of the float 14 is detected by the sensor 24 to be outside of the desired range of positions, the microcontroller 22 may cause the generation of an alarm signal, such as an audible or visual alarm or both.

The geometry and dimensions of the float 14 are selected relative to the viscosity and the flow rates expected for the catalyst, and relative to the geometry of the flow tube 12. The float 14 cooperates with the flow tube 12 and the flow of the catalyst to be in a desired range of positions for desired flow rates of a particular catalyst through the flow tube 12.

The flow sensor 10 advantageously utilizes magnetic fields and fluid shear forces of the catalyst to indicate when desired minimum flow of the catalyst is achieved. The sensor 10 also advantageously avoids the use of seals and rotating parts that are prone to corrosion and/or failure when exposed to reactive catalyst fluids.

In a preferred embodiment, as shown in connection with FIGS. 2-9, a flow sensor array 30 incorporates a plurality of flow sensors 30*a*, 30*b* and 30*c* to provide a catalyst flow monitoring and alert system according to the disclosure preferably having visual and audible alerts. The flow sensors 30*a*, 30*b*, and 30*c* each substantially correspond to the flow sensor 10 and include a catalyst flow tube 32 through which catalyst flows in the direction of the arrow A, and a float 34 having a magnet 36 embedded therein. The flow tubes 32 may be formed by machining the flow tubes 32 through a block of metal 38 such as stainless steel.

Flow sensors 30*a*-30*c* are used for sensing different aspects of catalyst flow for the array 30. For example, the flow sensor 30*a* is utilized to determine if the catalyst is flowing at least a desired minimum rate. The flow sensor 30*b* is utilized to determine if catalyst is flowing out a bypass valve of the array 30, which indicates that the catalyst is not being mixed with the resin. The flow sensor 30*c* is utilized to determine if catalyst is flowing out of an over-pressure outlet, which indicates that only a partial amount of the required catalyst is being mixed with the resin.

The flow sensor array 30 includes an enclosure 40, desirably of metal, that is bolted to the block of metal 38 through which the flow tubes 32 are machined. The enclosure 40 includes an electrical control circuit such as a circuit board 42 having a microcontroller 42*a* including a plurality of giant magnetoresistance (GMR) sensors 44, one located in proximity to each of the magnets 36 so as to be able to detect the location of the floats 34 having the magnets 36 in the catalyst flow tubes 32 of the flow sensors 30*a*-30*c*. The microcontroller 42 with the sensors 44 function to read the positions of the floats 34 of the flow sensors 30*a*-30*c* and alert an operator if any noteworthy states, such as fail states exist in any of the flow sensors 30*a*-30*c* and, if so, in which flow sensor the fail state has occurred.

Figure 9:
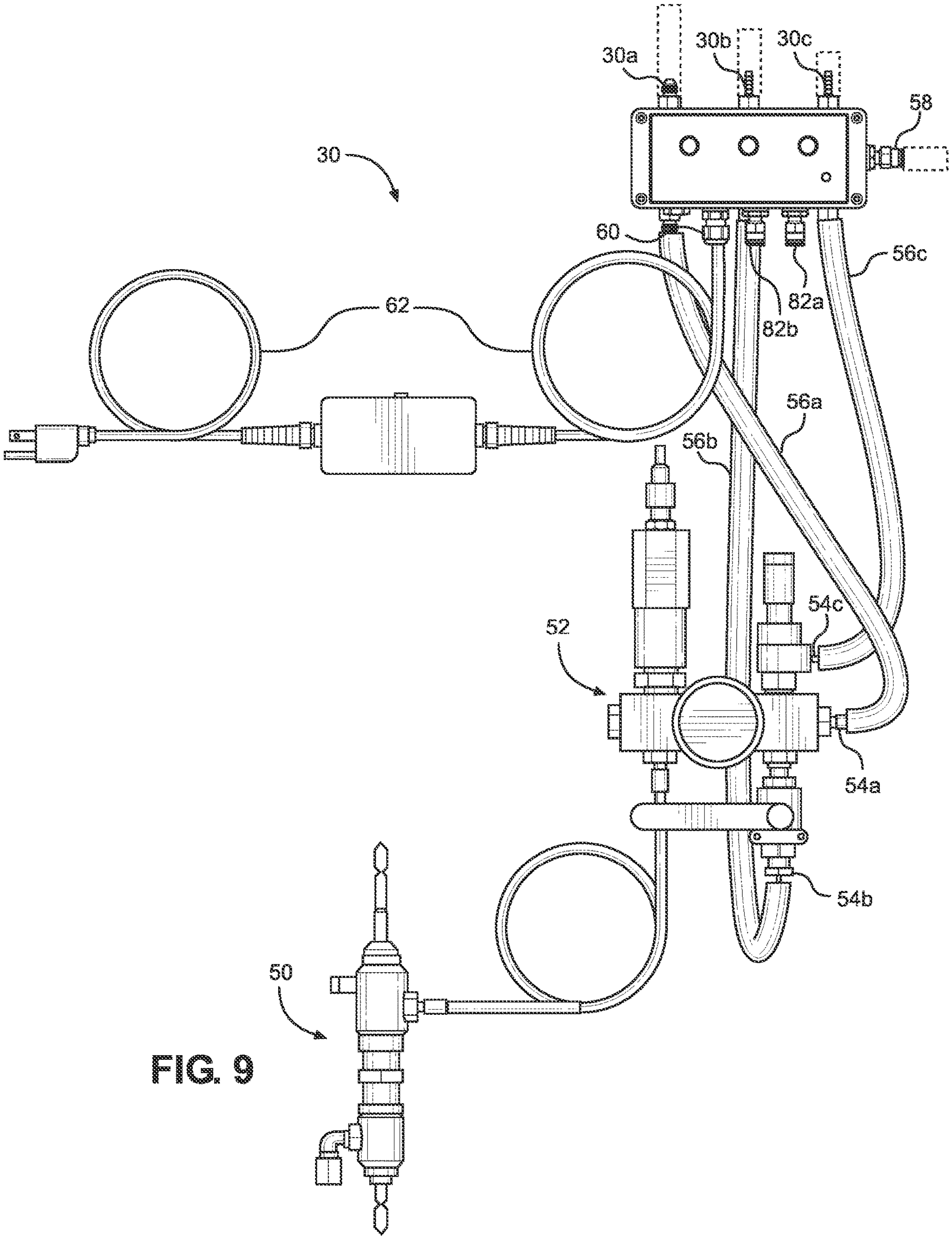
FIG. 9 is a perspective view showing additional components of the catalyst flow sensor array of FIG. 2.

As shown in FIG. 9, the catalyst is supplied from a source of catalyst by a catalyst pump 50 or the like to provide a pressurized flow of catalyst. The catalyst is fed initially to a manifold 52 having a supply outlet 54*a*, a recirculation outlet 54*b*, and an overpressure outlet 54*c*. These manifold outlets 54*a*-54*c* are connected via tubing 56*a*, 56*b*, and 56*c*, respectively, to input connectors of the flow sensors 30*a*-30*c*, respectively, for travel of catalyst to the array 30, and through the flow sensors 30*a*-30*c*.

Catalyst exiting the flow sensor 30*a* is routed via tubing to the spray gun, nozzle or other applicator device for mixing with the resin for application. The applicator device is typically pneumatic and exhausts air during operation. As described in more detail below, the exhaust air of the applicator device is harnessed and routed to an applicator air input 58 of the array 30 to be used to indicate to the array 30 when a spraying operation is being conducted.

During a spraying operation, the float 34 of the flow sensor 30*a* will rise if the minimum flow rate of the catalyst through the flow sensor 30*a* is such that the forces generated in the fluid gap caused by the shearing of the fluid between the float 34 and the flow tube 32 are sufficient to overcome the combined weight of the float 34 and the magnet 36 embedded in the float 34. The associated sensor 44 detects the position of the float 34 in the flow tube 32 of the flow sensor 30*a* and generates output signals corresponding to the detected position of the float 44. Likewise, if catalyst flows from the recirculation outlet 54*b* to the flow sensor 30*b* and/or catalyst flows from the overpressure outlet 54*c* to the flow sensor 30*c*, these flows of catalyst will act on the floats 34 of the flow sensors 30*b* and 30*c* and be detected by the associated sensors 44 in a similar manner.

As noted above, the geometry and dimensions of the floats 34 are selected relative to the viscosity and the flow rates expected for the catalyst, and for the geometry of the flow tubes 13 so as to cooperate to enable the floats 34 to be in a desired range of positions for desired flow rates of a particular catalyst. A preferred catalyst is MEKP having a viscosity of 31 mPas at 20 degrees C. The flow rate of the catalyst preferably ranges from about 0.65 fluid ounces per minute to about 19 fluid ounces per minute with a minimum flow rate of about 0.5 fluid ounces per minute.

Figure 7A:
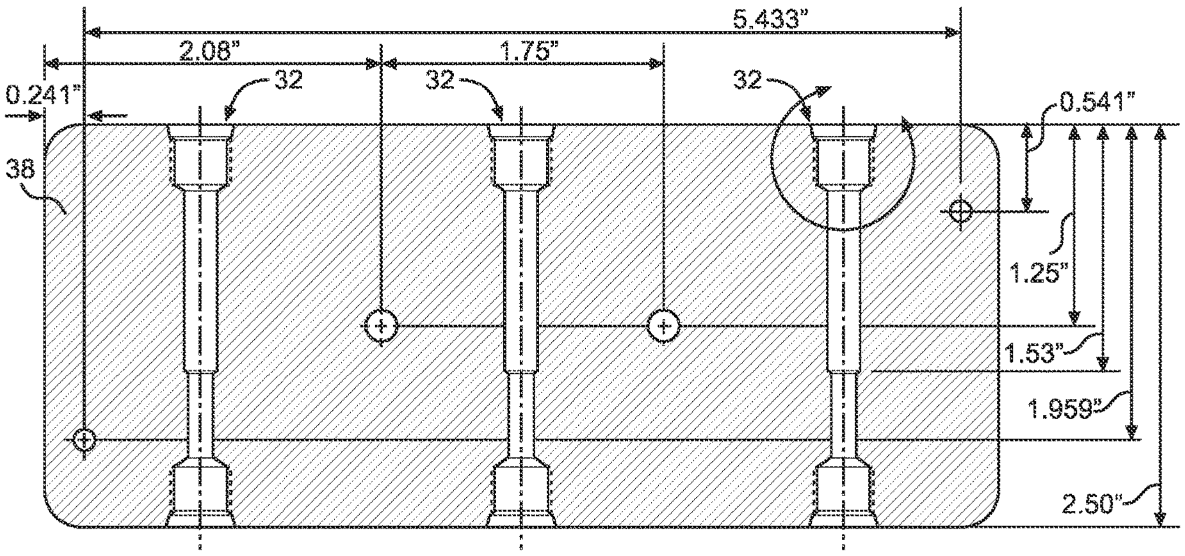
FIGS. 7A-7C show dimensions of components of the catalyst flow sensor array of FIG. 2.
Figure 7B:
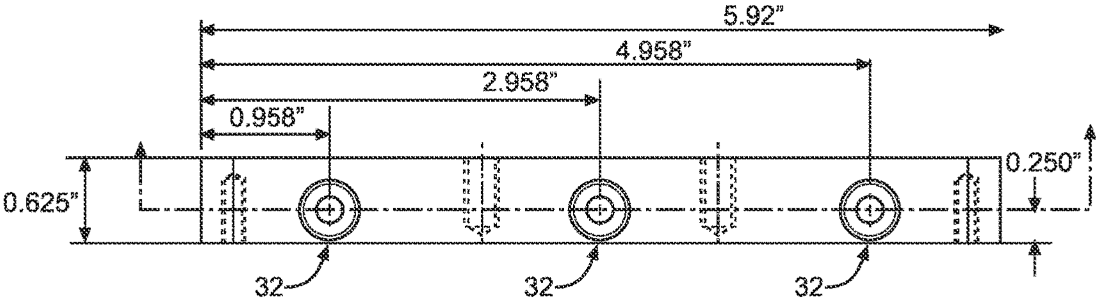
Figure 7C:
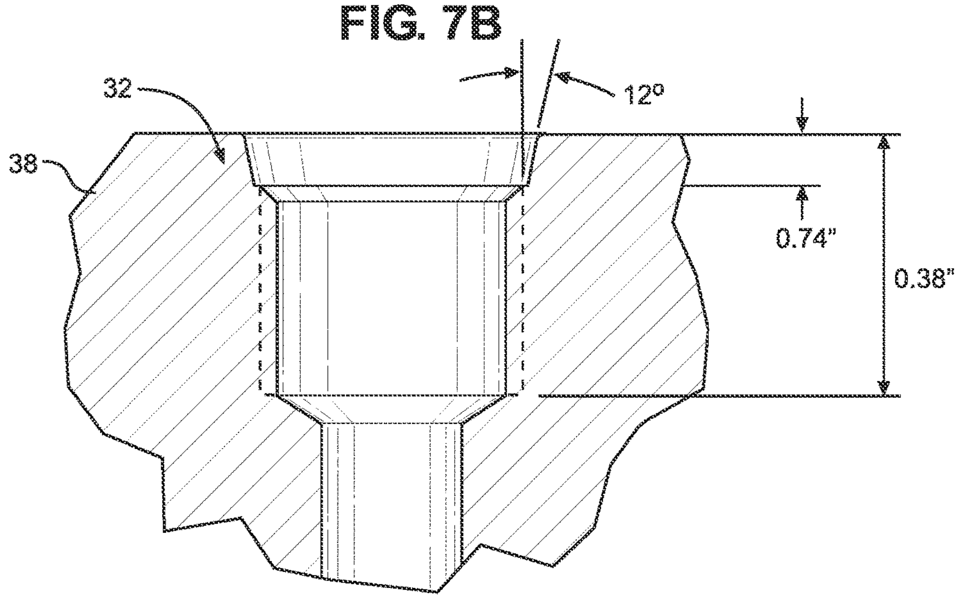

With reference to FIGS. 7A-7C, the catalyst flow tubes 32 of the flow sensors 30*a*-30*c* are desirably arranged and dimensioned as shown for use with the described catalyst.

Figure 8A:
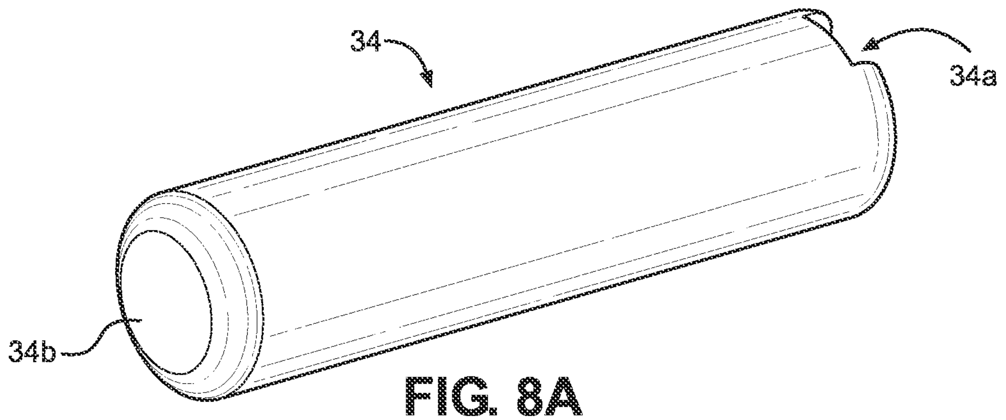
FIG. 8A is a perspective view of a float component of the catalyst flow sensor array of FIG. 2.
Figure 8B:
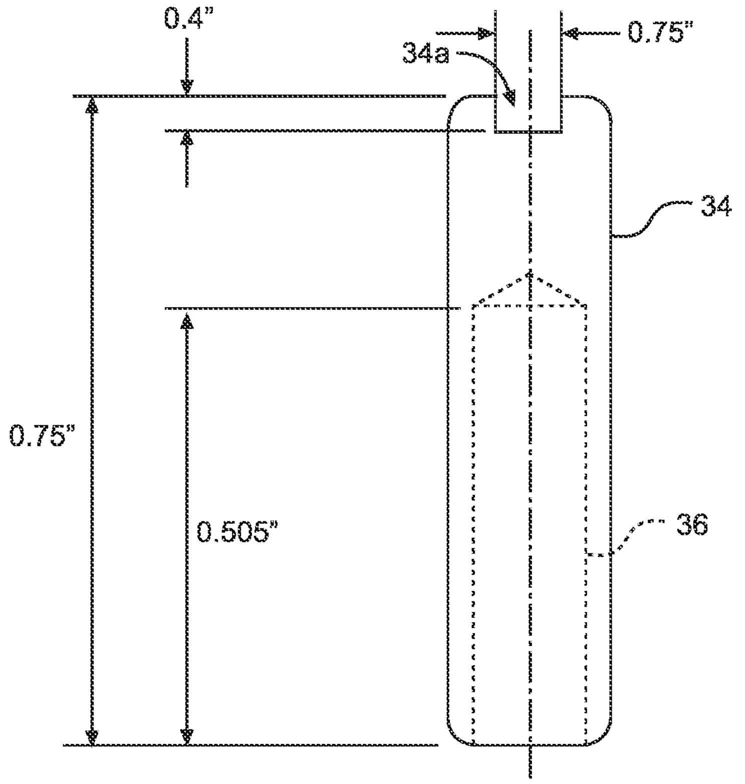
FIGS. 8B and 8C show dimensions of the float component.
Figure 8C:
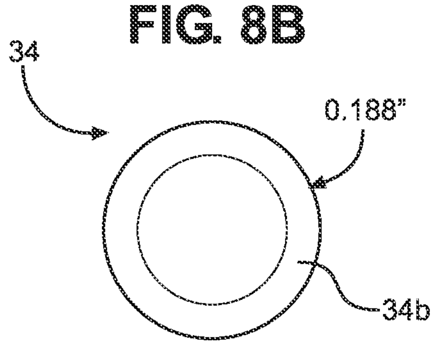

With reference to FIGS. 8A-8C, the floats 34 and the magnets 36 of the flow sensors 30*a*-30*c* are configured as shown for use with the described catalyst and flow tubes 32. The floats 34 preferably include a slot 34*a* on the bottom thereof and a top 34*b* that is flat with rounded edges. The slot 34*a* advantageously enables catalyst fluid to flow in the opposite direction and prevents the float 34 from sealing against a lip in the flow tube 32. The top 34*b* advantageously reduces frictional flow coefficients of the float 34.

The floats 34 are desirably made of 316 grade stainless steel with a weight of about 1.8 grams. The magnets 36 are preferably cylindrical and characteristics of a desirable magnet for use in providing the magnets 36 are set forth in Table 1 below:

TABLE 1

| | |
|---|---|
| Dimensions: | ⅛ inch diameter by ½ inch thick |
| Tolerances | +/−0.004 inch × +/−0.004 inch |
| Material | NdFeb, grade N52 |
| Plating/Coating | Ni-Cu-Ni (Nickel) |
| Magnetization Direction | Axial (Poles on Flat Ends) |
| Weight | 0.0266 ounces (0.754 grams) |
| Pull Force, Case 1 | 1.08 pounds |
| Pull Force, Case 2 | 1.09 pounds |
| Surface Field | 7343 Gauss |
| Max Operating Temperature | 176° F.(80° C.) |
| Brmax | 14,800 Gauss |
| Bhmax | 52 MGOe |

Figure 4:
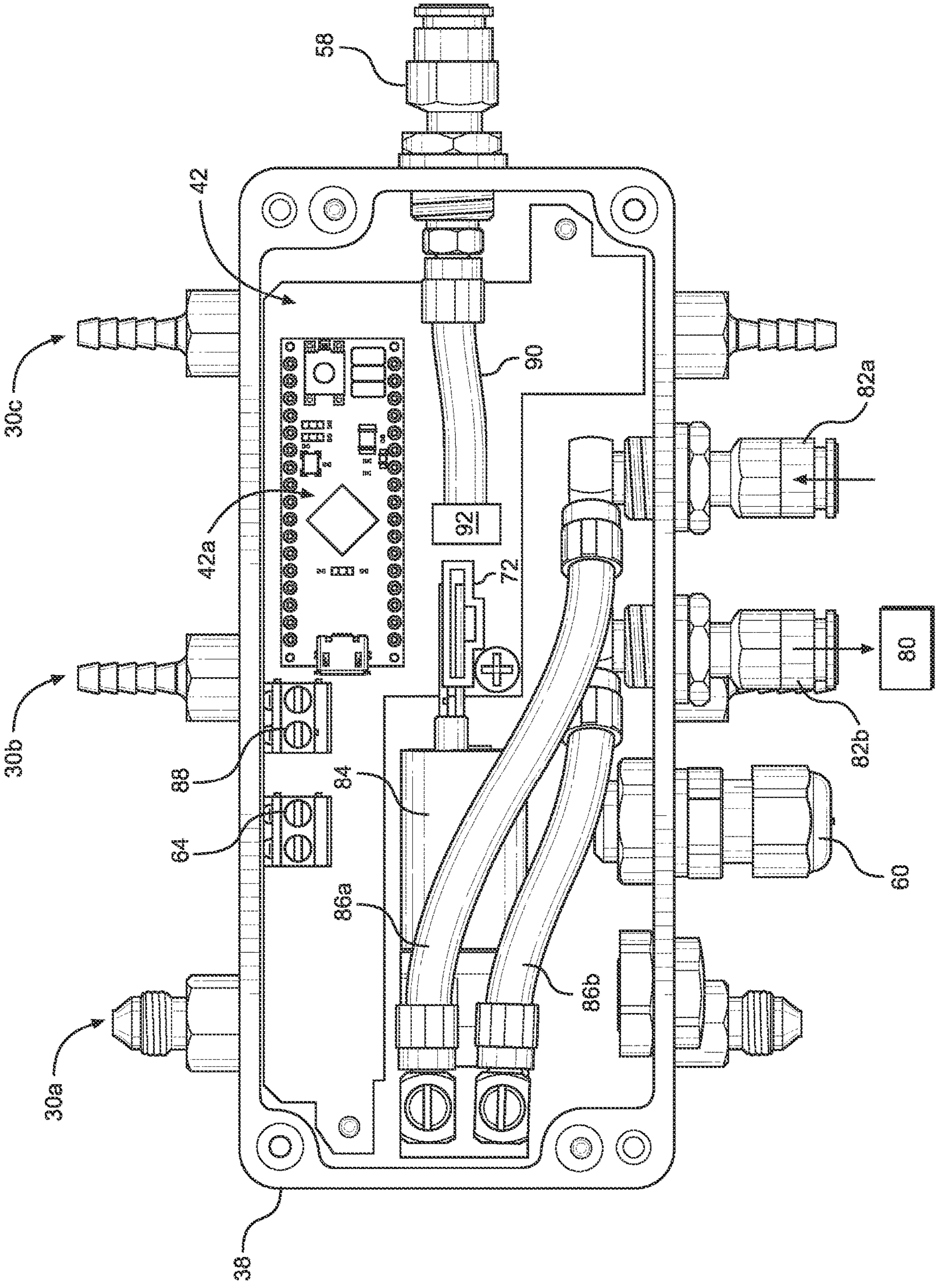
FIGS. 4-6 are interior views of the catalyst flow sensor array of FIG. 2.
Figure 5:
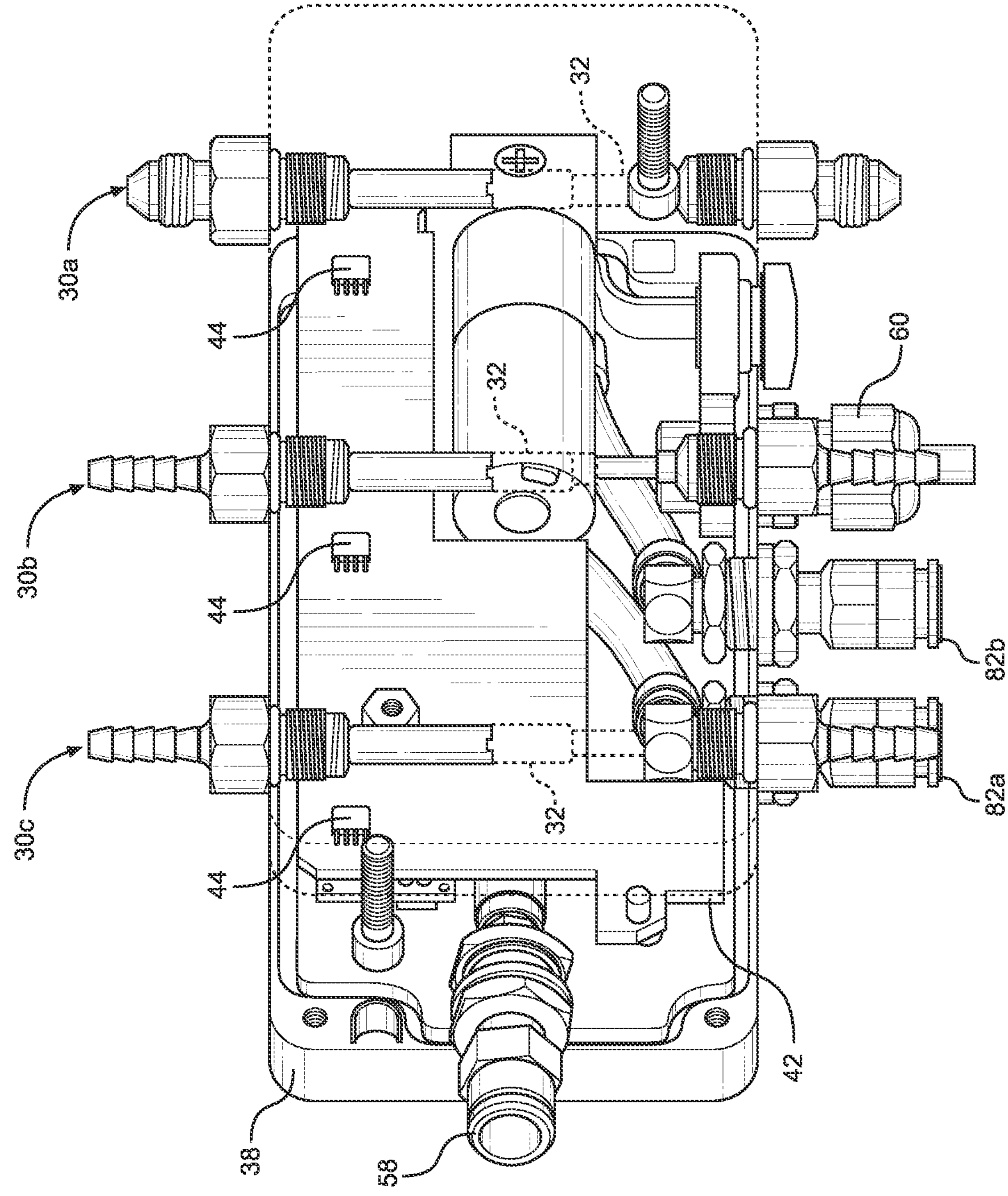
Figure 6:
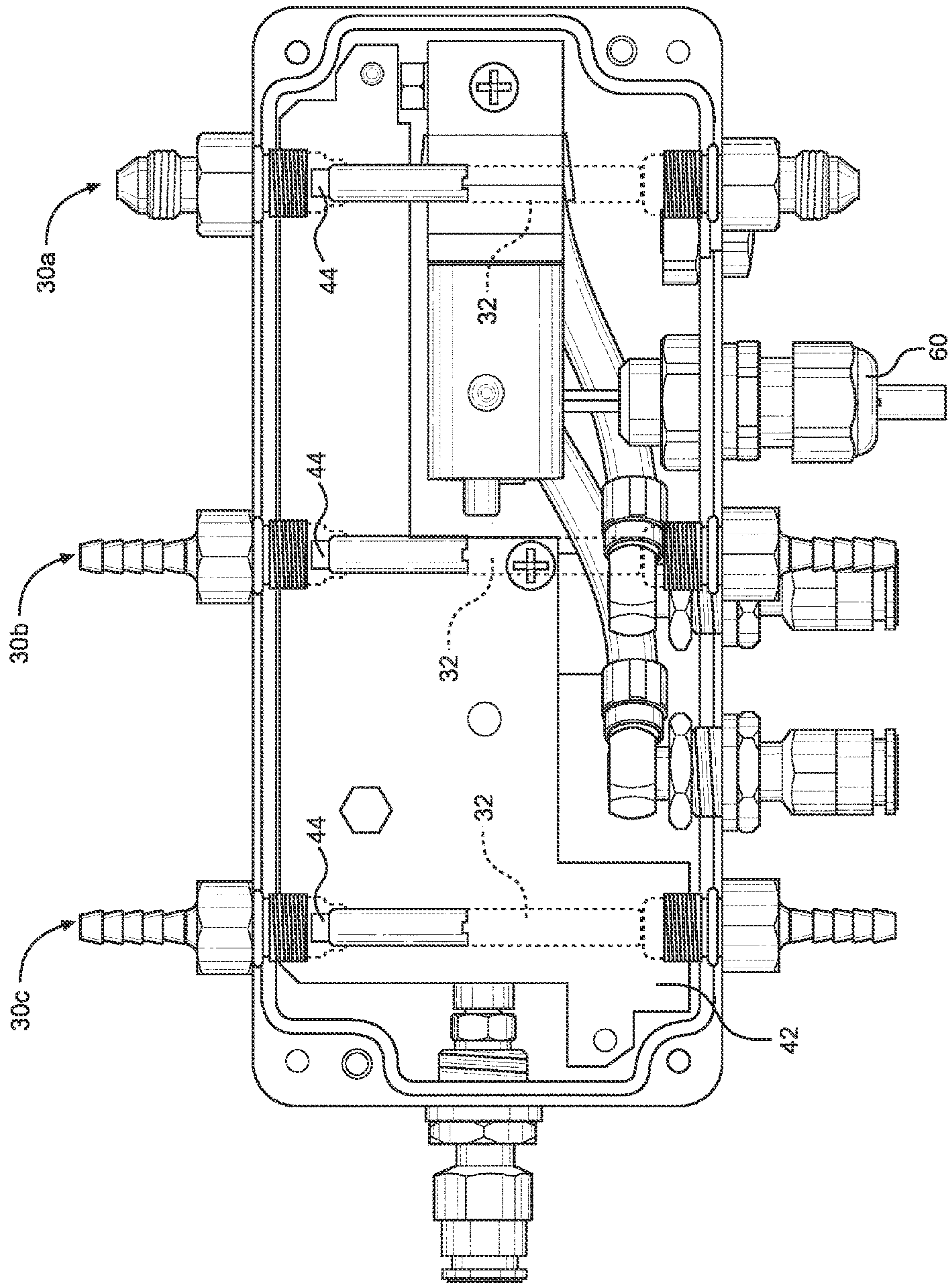

To power the circuit board 42, electrical power, preferably 12-volt direct current, may be supplied to the flow sensor array 30 via a power input 60 in electrical communication with a power supply, generally indicated with reference numeral 62 (FIG. 9). The power supply 62 is preferably provided by a 110-volt alternating current to 12-volt direct current power supply integrated into a cord that may be plugged into an electrical outlet, preferably 110-220 VAC 50-60 Hz. Electrical power is connected from the power supply 62 to the circuit board 42 via a power input terminal 64 on the circuit board 42 (FIG. 4). When electrical power is supplied to the circuit board 42, a power indicator lamp 66 is desirably illuminated to indicate to an operator that power has been supplied.

Lights or other visual indicators 70*a*, 70*b*, and 70*c* are provided to indicate if an undesirable flow of catalyst is detected by any of the flow sensors 30*a*-30*c*, respectively. In this regard, indicator 70*a* illuminates if the array 30 is powered and the flow of catalyst as detected by the flow sensor 30*a* is below the desired minimum flow. Indicators 70*b* and 70*c* illuminate when flow of catalyst occurs through the flow sensor 30*b* and 30*c*, respectively as explained more fully below. The indicators 70*a*-70*c* are connected to the circuit board 42 by an indicator terminal 72 and are controlled by the microcontroller 42*a* in response to signals received from the flow sensors 30*a*-30*c*.

With reference to FIG. 4, an audible alarm such as a whistle 80, which may be remote from the enclosure 40 is provided to indicate if an undesirable flow of catalyst is detected by any of the flow sensors 30*a*-30*c*, respectively. Upon hearing the alarm, the operator may look to the visual indicators to determine the cause of the alarm. The whistle 80 is air operated due to the reactive environment. Air is supplied into the array 30 via an alarm inlet air port 82*a* and routed from the array via an alarm outlet air port 82*b*. The alarm inlet air is routed from the port 82*a* to a solenoid valve 84 via conduit 86*a* and from the valve 84 to the port 82*b* by conduit 86*b*. The valve 84 is connected to the circuit board 42 by a valve terminal 88 and are controlled by the microcontroller 42*a* in response to signals received from the flow sensors 30*a*-30*c*. In the event the flow of catalyst as detected by the flow sensor 30*a* is below the desired minimum flow and/or flow of catalyst occurs through the flow sensor 30*b* and 30*c*, the valve 84 will open to supply air to the whistle 80.

The indicators 70*a*-70*c* and alarm 80 are desirably only activated when a spraying operation is being conducted. As mentioned above, exhaust air of the applicator device is harnessed and routed to the applicator air input 58 of the array 30 to be used to indicate to the array 30 when a spraying operation is being conducted. This input air is utilized by the array 30 to connect the indicators 70*a*-70*c* and the solenoid valve 84 to the circuit board 42 to arm them for use. With reference to FIG. 4, this may be accomplished as by routing the air from the air input 58 via tubing 90 to an air pressure sensor 92. The microcontroller 42*a* reads pressure signals from the sensor 92. When a sufficient pre-selected air pressure corresponding to a spraying operation is sensed, the indicators 70*a*-70*c* and the solenoid valve 84 are activated. A sensitivity adjustment for adjustment of the pre-selected air pressure may be incorporated.

Figure 10:
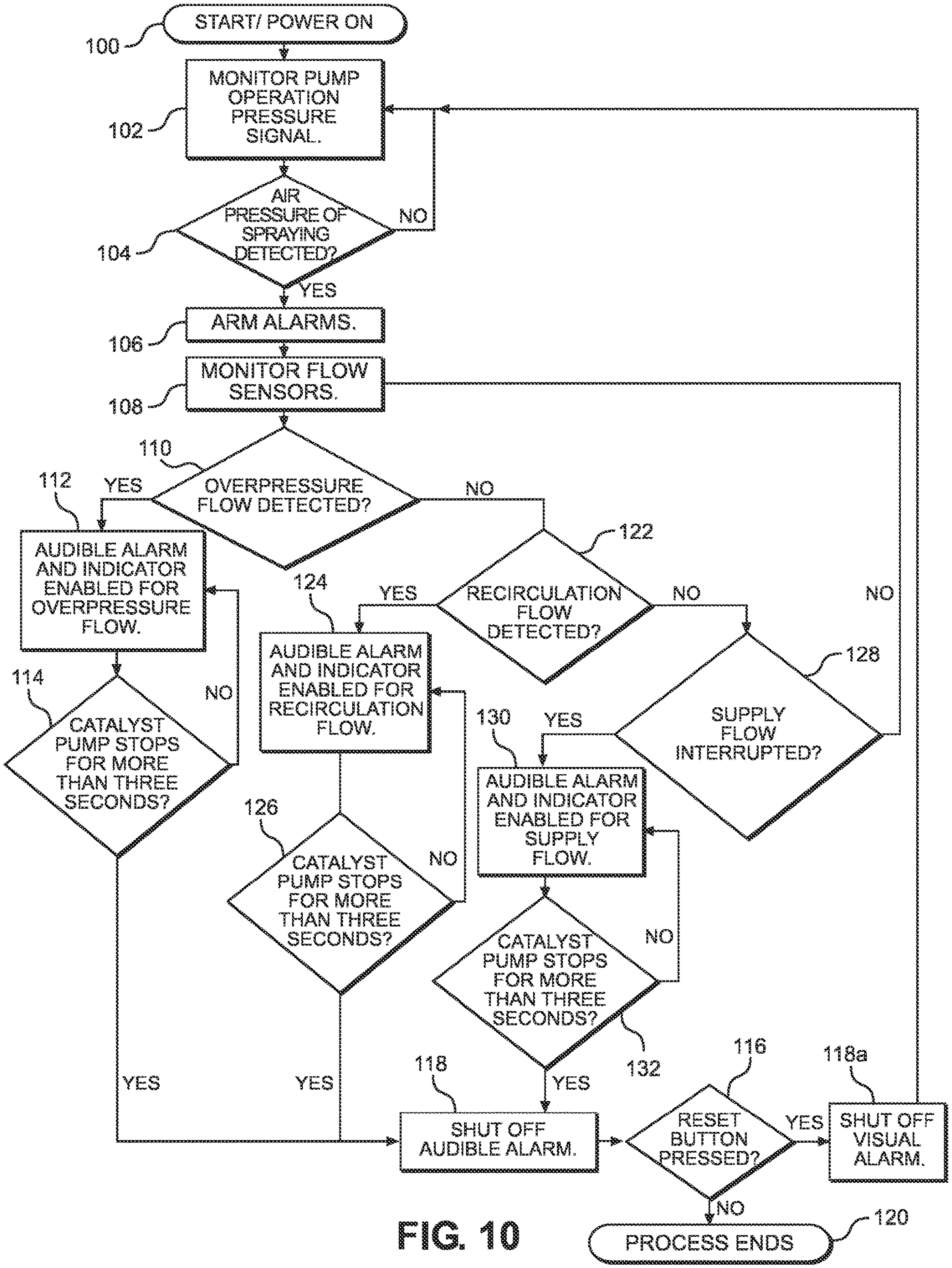
FIG. 10 depicts a flow chart of alarm logic for the catalyst flow sensor array of FIG. 2.

FIG. 10 depicts an example of flow chart of alarm logic implemented by the microcontroller 42*a* in operation of the flow sensor array 30. For example, in a first step 100 electrical power is supplied to the circuit board 42 and in step 102 the air pressure sensor 92 monitors any exhaust air pressure of a spraying operation. When a sufficient pre-selected air pressure corresponding to a spraying operation is detected by the air sensor 92 (step 104) the indicators 70*a*-70*c* and the solenoid valve 84 are activated (step 106). For example, the sensor 92 may sense sufficient air pressure if three consecutive pressure pulses are sensed.

As seen in step 108, catalyst flow is monitored by the flow sensors 30*a*-30*c*. As will be noted, the indication of an active spraying operation requires a flow of catalyst to the sprayer/applicator. Step 110 relates to the operation of the flow sensor 30*c*. If catalyst flows from the overpressure outlet 54*c* to the flow sensor 30*c* this will be detected and the indicator 70*c* illuminated and the solenoid valve 84 activated to supply air to the whistle 80 (step 112). The whistle 80 and the indicator 70*c* should alert the operator to cease the spraying operation, which results in a cessation of exhaust air to the applicator air input 58. In the event cessation of air flow is not detected, the indicator 70*c* remains illuminated and air continues to be supplied to the whistle 80. Once a cessation of air flow has been detected, such as for three seconds, as seen in step 114, the microcontroller 42*a* will activate the solenoid valve 84 to stop air flow to the whistle 80 (step 116). If the issue is corrected, the operator can turn off the indicator 70*c* (steps 118 and 118*a*) and the microcontroller 42*a* awaits re-activation (return to step 102). If the issue is not corrected, the spraying operation is deemed ended (step 120). If spraying resumes, the fail state is reset.

Returning to step 110, if the flow sensor 30*c* does not detect an over-pressure condition, the process proceeds to step 122 which relates to operation of the flow sensor 30*b*. If catalyst is flowing from the recirculation outlet 54*b* to the flow sensor 30*b* this will be detected and the indicator 70*b* illuminated and the solenoid valve 84 activated to supply air to the whistle 80 (step 124). The whistle 80 and the indicator 70*b* should alert the operator to cease the spraying operation, which results in a cessation of exhaust air to the applicator air input 58. Once a cessation of air flow has been detected, such as for three seconds, as seen in step 126, the microcontroller 42*a* will activate the solenoid valve 84 to stop air flow to the whistle 80 (return to step 116). In the event cessation of air flow is not detected, the indicator 70*b* remains illuminated and air continues to be supplied to the whistle 80.

Returning to step 122, if the flow sensor 30*b* does not detect recirculation flow, the process returns to step 128, which relates to operation of the flow sensor 30*a*. If the flow rate of catalyst through the sensor 30*a* is below the desired minimum flow, this will be detected and the indicator 70*a* illuminated and the solenoid valve 84 activated to supply air to the whistle 80 (step 130). The whistle 80 and the indicator 70*a* should alert the operator to cease the spraying operation, which results in a cessation of exhaust air to the applicator air input 58. Once a cessation of air flow has been detected, such as for three seconds, as seen in step 132, the microcontroller 42*a* will activate the solenoid valve 84 to stop air flow to the whistle 80 (return to step 116). In the event cessation of air flow is not detected, the indicator 70*a* remains illuminated and air continues to be supplied to the whistle 80.

Figure 11:
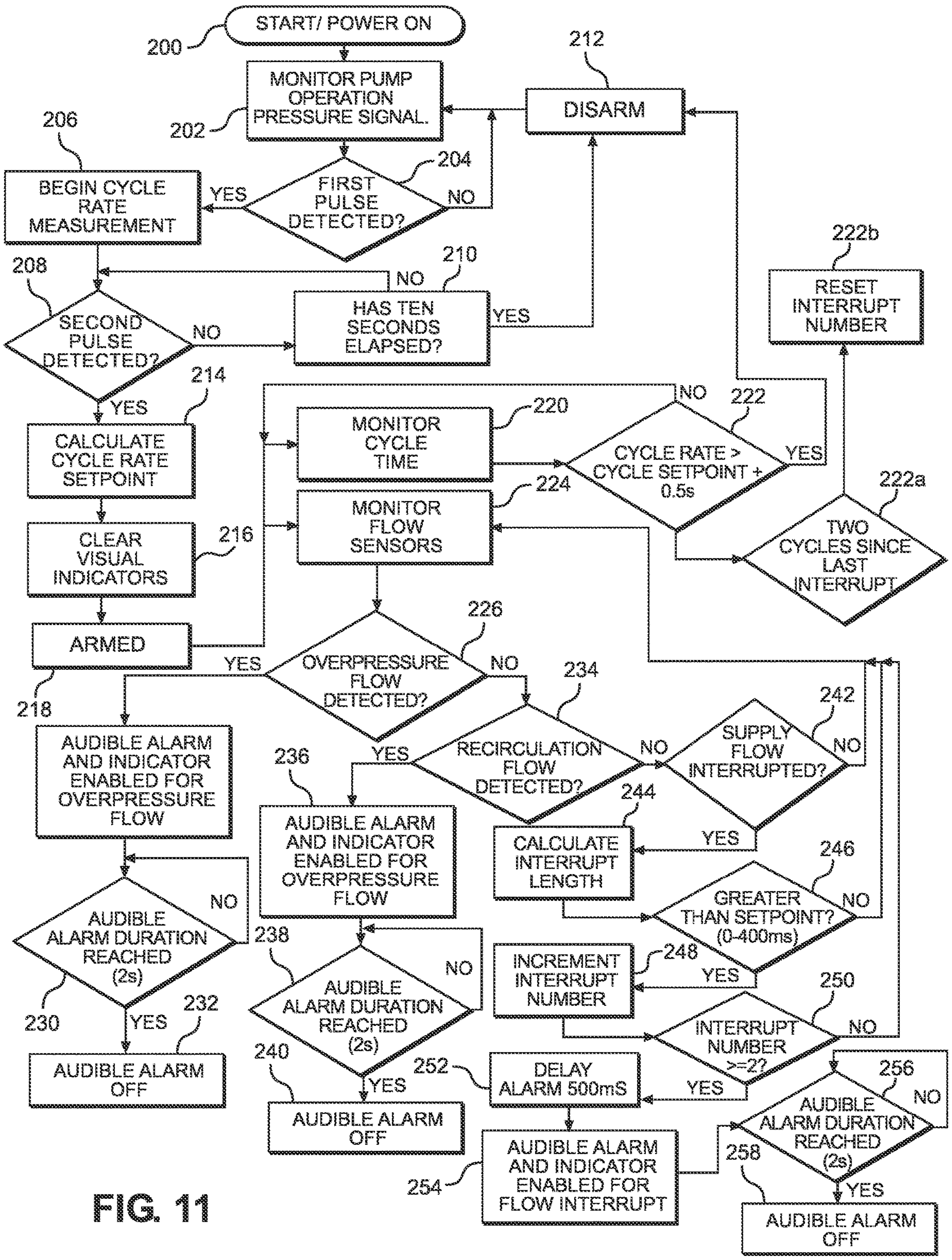
FIG. 11 depicts an alternate flow chart of alarm logic for the catalyst flow sensor array of FIG. 2.

FIG. 11 depicts another example of a flow chart of alarm logic implemented by the microcontroller 42*a* in operation of the flow sensor array 30. For example, in a first step 200 electrical power is supplied to the circuit board 42 and in step 202 the air pressure sensor 92 monitors any exhaust air pressure of a spraying operation, which exhaust air is delivered in pulses from the spray equipment.

When a first pulse of air pressure is detected by the air sensor 92 (step 204), a measurement of the cycle rate of air pressure pulses detected by the air sensor 92 begins (step 206). If a second pulse of air is detected (step 208), a determination of the time between detection of the first pulse of air and the second pulse is made and compared to a predetermined time between pulses, such as 10 seconds (step 210). If the time between pulses exceeds the predetermined time, then a disarm command is sent (step 212) and the process returns to step 202. If the time between pulses does not exceed the predetermined time, then a time corresponding to the determined time from step 210 is set in step 214 as the cycle rate of the exhaust air pulses and the indicators 70*a*-70*c* are cleared (step 216) and the indicators 70*a*-70*c* and the solenoid valve 84 are activated (step 218).

Once the indicators 70*a*-70*c* and the solenoid valve 84 are activated, the cycle rate of the exhaust air pulses is monitored (step 220) and compared (step 222) to the rate set in step 214. If the cycle rate does not exceed the rate set in step 214, monitoring continues. If the rate exceeds the rate, the process proceeds to step 212 and a disarm command is sent. If the spraying operation continues, a new cycle rate of the exhaust air pulses may be periodically set based on the continuing operation of the spraying equipment (steps 222*a* and 222*b*).

In addition, the flow sensors 30*a*-30*c* are monitored in step 224. The decision tree first looks to overpressure flow, then recirculation flow, and then feed flow in order to sound the alerts, but undesired flow sensed by any of the flow sensors 30*a*-30*c* will trigger the alerts. In step 226, if catalyst flows from the overpressure outlet 54*c* to the flow sensor 30*c*, this will be detected and the indicator 70*c* is illuminated and the solenoid valve 84 is activated to supply air to the whistle 80 (step 228). As shown in steps 230 and 232, the whistle 80 is activated for a desired time period, such as 2 seconds, and then turned off.

In step 234, if catalyst flows from the recirculation outlet 54*b* to the flow sensor 30*b*, this will be detected and the indicator 70*c* is illuminated and the solenoid valve 84 activated to supply air to the whistle 80 (step 236). As shown in steps 238 and 240, the whistle 80 is activated for a desired time period, such as 2 seconds, and then turned off.

In step 242, if catalyst flows from the supply outlet 54*a* through the sensor 30*a* and this flow rate is at or above the desired minimum flow, the process returns to step 224. If the flow rate is below the desired minimum flow, this condition represents an interrupted flow of the catalyst. In such case, the degree of interruption is calculated in step 244 and compared to a set point, such as between 0 and 400 ms (step 246). If the interruption is less than the set point, the process returns to step 224. If the interruption is greater than the set point, in step 248 the number of interrupts is determined and then compared in step 250 to a predetermined interrupt number, such as 2. If the number of interrupts is at or less then the predetermined interrupt number, the process returns to step 224. If the number of interrupts is greater than the predetermined interrupt number, in step 252 a signal is generated indicating that catalyst flow has been interrupted and in step 254 the indicator 70*a* is illuminated and the solenoid valve 84 activated to supply air to the whistle 80. As shown in steps 256 and 258, the whistle 80 is activated for a desired time period, such as 2 seconds, and then turned off.

As will be appreciated, the present disclosure advantageously provides flow sensors that enable flow detection utilizing magnetetic fields to detect the position of a magnet housed in a float that is affected by fluid flow. Such sensors have been observed to be particularly suitable for use in determining and monitoring the flow of highly reactive catalysts for which conventional flow sensors are unsuited.

Further, the disclosure incorporates such flow sensors to provide systems configured for use with catalysts to detect when the flow rate of the catalyst is outside of a desired range, and to alert operators when undesirable flow conditions occur.

The systems employ the use a microcontroller to read the position of floats in a flow sensor array then to alert the operator if any fail-states exists and which one it is. Additionally, the system advantageously does not require any operator input or calibration and can sense when a spraying operation is active and activate the alerts only during that time.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention.

The invention claimed is:

1. A flow monitoring system, comprising:

a source of pressurized liquid capable of providing a feed flow of the liquid, or a recirculating flow of a liquid, or an overpressure flow of the liquid, or combinations thereof;

a first flow sensor for receiving the feed flow of the liquid and sensing flow characteristics associated with the feed flow of the liquid;

a second flow sensor for receiving the recirculating flow of the liquid and sensing recirculating characteristics associated with the recirculating flow of the liquid;

a third flow sensor for receiving the overpressure flow of the liquid and sensing flow characteristics associated with the overpressure flow of the liquid; and an electronic circuit including:

a first alarm that is activated if the first flow sensor detects that the feed flow is below a predetermined minimum flow rate;

a second alarm that is activated if the second flow sensor detects the recirculating flow; and a third alarm that is activated if the third flow sensor detects the overpressure flow.

2. The system of claim 1, wherein the liquid comprises a catalyst liquid.

3. The system of claim 2, wherein the catalyst liquid comprises methyl ethyl ketone peroxide.

4. The system of claim 1, wherein the first, second, and third flow sensors each comprise:

a flow tube having a float located therein and configured for liquid flowing in the flow tube to flow around the float, each float including a magnet, wherein the position of the magnet in the flow tube of is related to flow characteristics associated with the liquid flowing around the float; and a giant magnetoresistance sensor for sensing the position of the magnet in the float.

* * * * *